March 15, 1966 R. L. PITZER 3,240,073
LINEAR ACCELEROMETER
Filed March 1, 1962
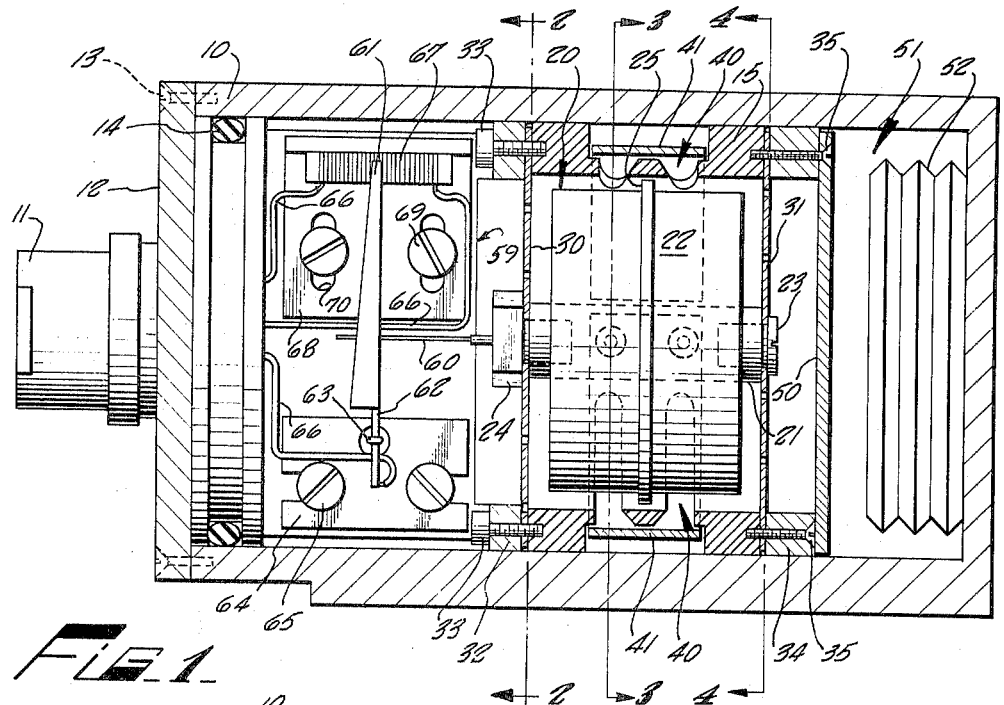
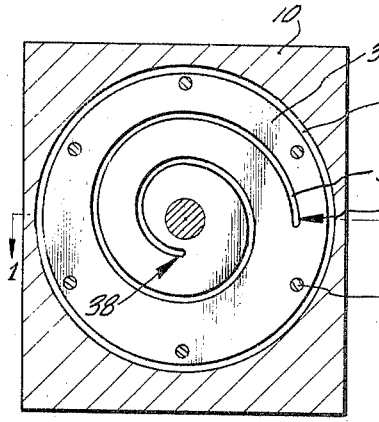
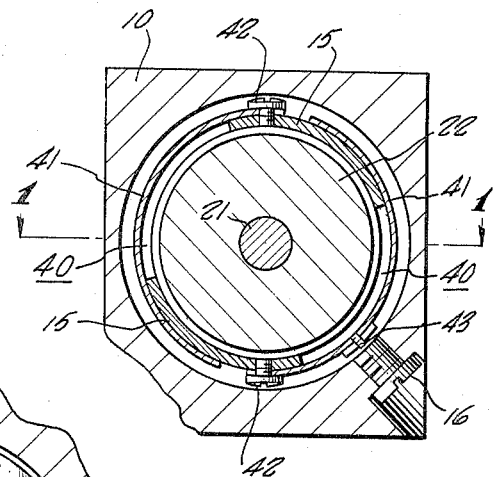
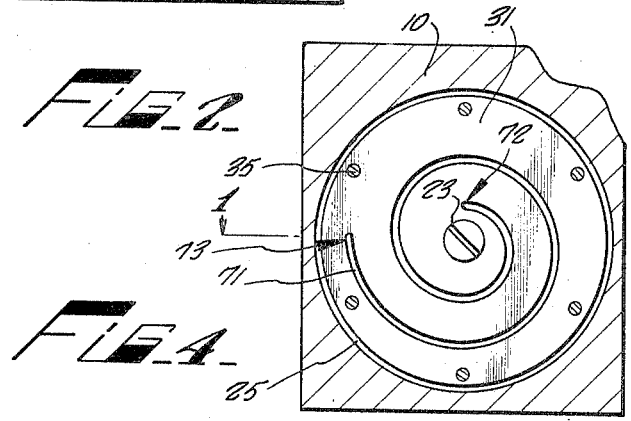
INVENTOR.
ROBERT L. PITZER
BY
Christie Parker & Hale
ATTORNEYS.

3,240,073
LINEAR ACCELEROMETER
Robert L. Pitzer, Arcadia, Calif., assignor to Edcliff Instruments, Inc., Monrovia, Calif., a corporation of California
Filed Mar. 1, 1962, Ser. No. 176,680
7 Claims. (Cl. 73—517)

This invention relates to a linear accelerometer.

A linear accelerometer is an instrument for measurement of the rate of acceleration in a given linear direction. The placement of three accurate linear accelerometers along the vertical, horizontal, and lateral axes of a moving object and correlation of the data from each, can give an accurate understanding of the acceleration and path of travel of the object in all directions. The basic principle depends upon the measurement of the movement of a movable weighted mass, the position of which will change at times of acceleration or deceleration, due to inertia.

Heretofore, accurate measurement of acceleration along an axis by a linear accelerometer has been difficult due to various problems caused, or not overcome by former methods of construction.

Low cross-axis sensitivity may be obtained by supporting the mass with a parallelogram type spring, but such a spring is bulky and wasteful of space, making an accelerometer with such construction undesirable for the many installations wherein compact size is a necessity. The use of a linear ball bearing to support the mass has also been attempted, but accelerometers employing such bearing supports are often troubled by friction and bearing damage during shock.

A double spiral spring for supporting the mass has also been used to obtain straight line motion. However, the use of a double spiral spring results in a very limited range of travel of the mass within the linearity requirements of a precision instrument.

The present invention provides a linear accelerometer with virtually zero cross-axis sensitivity, and in addition meets the requirements of compactness and shock resistance necessary in such an instrument. This invention provides a movable mass supported within a housing by first and second spiral springs mounted at respective ends of the mass transverse to the direction of longitudinal movement of the mass within the housing. The springs are arranged to coact to permit the ends of the mass to rotate in substantially equal but opposite arcs when the mass is subjected to acceleration forces so that the center of the mass travels in a longitudinal direction. Means are provided to measure the amount and direction of the longitudinal movement of the mass.

In operation, the body is positioned so that the longitudinal movement of the mass is along the axis wherein measurement is desired. Proper orientation of the spiral springs, it has been discovered, will permit the ends of the mass to move rotatably at times when cross-axis forces are applied, but the movements of the ends are caused to be equal and opposite, resulting in zero cross-axis movement of the center of the mass. Means measuring the resulting longitudinal movement of the mass, therefore, achieve a true measurement of linear movement along the axis desired to be measured.

It is another feature of this invention to provide a shock-proof construction and a temperature-controlled damping means to give extremely accurate sensitivity at all temperature ranges to be encountered in use.

This invention is described in more detail in reference to the accompanying drawings, in which:

FIG. 1 is a cross-section view along the lines 1—1 of FIGS. 2, 3 and 4;

FIG. 2 is a cross-section view along line 2—2 of FIG. 1;

FIG. 3 is a cross-section view along line 3—3 of FIG. 1; and

FIG. 4 is a cross-section view along line 4—4 of FIG. 1.

Referring now to the drawings, in which like reference numerals denote like elements on all figures, in the presently preferred embodiment of the invention, an inertial mass generally indicated at 20 is loosely fit within a housing 15 disposed within an enclosing case 10. The mass 20 may be made from any material having the desired weight characteristics, for example, a heavy tungsten alloy for low acceleration range usage, or aluminum or brass for high acceleration range usage. In the event the housing 15 and the mass 20 are to be made from materials having different temperature coefficients of expansion, the mass 20 should be made from two elements as illustrated, a center shaft 21 and a hollow cylindrical weight member 22. The shaft 21 carries on its ends all of the elements required to be attached to the mass, such as a flexure wire 60 and a pair of spiral springs 30 and 31 which will be described in more detail. The center shaft 21 may be press fit into the central opening of the weight member 22. The center shaft 21 is made from a material having the same temperature coefficient as the housing 15, and the weight member 22 may be made from any material having the desired weight characteristics. Of course, where the material of the housing 15 has the desired weight characteristics for use in the mass 20, the mass 20 may be made from such material and may also be made in one piece.

In the preferred embodiment, the mass 20 is attached at its ends by any suitable means such as bolts 23 and 24 to two substantially identical flat single spiral springs 30 and 31. Referring to FIGURE 2, illustrating the first spring 30, the spring 30 is a flat spring plate with a spiral slot 36 cut clockwise therein beginning at an outer point 37 near but not at the outer edge of the spring plate and terminating at an inner point 38. Other forms of single spiral springs may be used, but the preferred form illustrated has the advantage of great compactness. A supporting ring 32 and a plurality of bolts 33 are provided to secure the outer edge of the spring 30 to the housing 15 (as illustrated in FIGURE 1). The center of the spring 30 is attached by means such as a bolt 24 to the center shaft 21 of the mass 20. As can be seen in FIGURE 1, the spring 30 is mounted transverse to the longitudinal axis of the mass 20, the longitudinal axis being defined by the center shaft 21. Thus the end of the mass 20 may move longitudinally along its longitudinal axis while being supported by spring 30 and may also translate and rotate relative to the normal position of the mass axis due to the spiral nature of the spring 30.

Referring to FIGURE 4, the second spring 31, substantially identical to first spring 30, is attached by a bolt 23 to the opposite end of the center shaft 21 from first spring 30. The second spring 31 is disposed parallel to first spring 30, and is attached to the housing 15 by a plurality of bolts 35 and supporting ring 34, at its outer edge. The first and second springs are arranged so that corresponding portions of the springs are angularly displaced by substantially 180° about the longitudinal axis of the mass 20. FIGURE 4 is taken in the same direction as FIGURE 2, and accordingly, spiral slot 71 of spring 31 proceeds clockwise about the center of the spring. The inner terminal point 72 of the spiral slot 71 of second spring 31 is disposed on the opposite side of the longitudinal axis of the mass 20 from the inner terminal point 38 of the spiral slot 36 of the first spring 30 and the beginning point 73 is correspondingly disposed. The second spiral spring 31 thus permits longitudinal movement of the mass 20 in the same directions as first spring 30, but the translation of the end of mass 20 to which second spring 31 is attached must, due to the orientation of the springs, be in a direction opposite that of the end of mass 20 attached to first spring 30. Thus the opposite end translations will cancel one another and the center 25 of mass 20 will move only longitudinally. Therefore by placing the apparatus in such manner that the longitudinal axis of the mass 20 lies along the axis of movement desired to be measured, it can be seen that only forces along such axis will result in longitudinal movement of the mass 20, and thus measurement of such longitudinal movement of mass 20 is a measure of only the effects of acceleration along the desired axis of the object, as the effects of the translation of the ends of the mass 20 have been cancelled by the spring arrangement of this invention. The ends of the shaft rotate in the same direction as the ends of the shaft translate in opposite directions and thus the shaft is not torsionally loaded as acceleration forces are applied to the accelerometer.

Any desired means may be provided to measure the longitudinal movement of mass 20. For example, in the preferred form, a flexure wire 60 is attached to the center shaft 21. The flexure wire 60 may be made of music wire or any spring steel which will withstand flexing without fatigue or introduction of excessive hysteresis. The flexure wire 60 is suitably attached to a brush element 61 provided at one end with contact means (not shown) and attached at the other end to a flexure member 62. The flexure member 62 is attached at 63 to a plate 64 to form a cantilever beam arrangement. The plate 64 is adjustably attached as by a plurality of bolts 65 in slots on plate 64 to the housing 15 by means of supporting ring 32 which is a part of a support member 59 to which plate 64 is mounted. A cross-spring pivot may be substituted for this form of attachment if desired. Longitudinal movement of the mass 20 pushes or pulls on flexure wire 60, depending upon direction of movement, to slide brush element 61 along an elongated resistance element 67 to produce measurable current variations. The resistance element 67 is attached to a plate 68 having cut therein a plurality of elongated slots 70. Bolts 69 hold plate 68 to the support member, and adjustment along slots 70 permits calibration of the resistance element 67 by altering the effective radius of brush 61. Suitable lead wires, such as 66, pass through top plate 12 of the case 10 to connector means 11.

In the preferred embodiment, greater shock resistance is obtained by enclosing the housing 15 in the outer case 10, which by use of fill screw 16 is filled with a damping oil. See FIG. 3. An end plate 12 may be attached to the case 10 by a plurality of bolts 13 and the end plate sealed by an O-ring 14. The mass 20 acts as a piston in a cylinder formed by the housing 15 pumping the damping oil from one side of itself to the other through elongated slots or orifices in the housing 15 indicated at 40. A ringlike projection 25 extends from the center of mass 20, formed as an integral part of weight member 22, and assists in pumping the oil through the orifices 40. Because of the changing viscosity of the damping oil as temperature changes, uniform oil flow may be maintained by attaching a plurality of bimetal strips 41 to the body 15 by any suitable means such as a plurality of bolts 42. The strips 41 are positioned over the oil flow orifices 40 in the housing 15 as illustrated in FIGURE 3. One of the strips 41 may be positioned to provide a sufficient flow under desired normal conditions by use of set screw means 43 disposed under oil fill screw 16 so as to be reached for adjustment by removal of the oil fill screw 16. (See FIG. 3). The bimetal strips 41 and the orifices 40 form oil passages between the sides of the mass 20 and the case 10. The bimetal strips 41 are arranged to cooperate with the housing 15 to enlarge the oil flow passages as the temperature lowers and the oil becomes more viscous, and to restrict the flow through the oil passages as the temperature rises. The oil passages in the preferred form are adapted to keep the amount of oil flowing at high velocity at a minimum in order to keep the natural frequency of the instrument high, although in installations where an abnormally low natural frequency is desired the passages may be altered to lengthen the flow distance of the oil or otherwise to increase flow velocity.

As the damping oil increases in temperature it also expands, and to prevent the building up of internal pressure an orifice plate 50 is provided to divide the interior of the case 10 into a first compartment containing the housing 15 and a second compartment indicated generally at 51 and containing a bellows 52 filled with compressible gas adapted to cooperate with the expanding damping oil to maintain substantially constant oil pressure at any temperature. In order that expanding oil in the first compartment containing the housing 15 may reach the second compartment 51 the orifice plate 50 is fit to the case 10 loosely enough that a leakage flow of expanding oil may seep past in either direction. However, to prevent the damping oil in the larger first compartment from rushing to the second compartment 51 and compressing the bellows 52 under dynamic acceleration conditions, the orifice plate 50 is fit to the case 10 sufficiently tightly to limit the flow rate to that necessary to accommodate the small leakage flow due to expansion and contraction of the damping oil. The orifice plate 50 is attached to ring 34 which also serves to support second spring 31, by any suitable means such as a plurality of bolts 53 which may extend through ring 34 and second spring 31 into the body 15 for greater strength.

The entire apparatus according to the preferred embodiment as described herein is so compact that it is contained within a case smaller than two and one-half inches by one and one-half inches by one and one-half inches.

It was mentioned above that it is preferred that shaft 21 and mass housing 15 are fabricated from materials having equal thermal coefficients of expansion. This is preferred to assure that springs 30 and 31 remain planar regardless of the temperature of the accelerometer.

Various modifications of the linear accelerometer described herein will be apparent to those skilled in the art, and the enumeration of certain examples herein is not intended to exclude from the concept of the invention other variations apparent to one skilled in the art but not enumerated herein.

In the apparatus described above, the center of mass of seismic mass 22 does not shift from the longitudinal axis of the transducer when forces are applied obliquely of the longitudinal axis of the transducer. The spirals in spring plates 30 and 31 are both clockwise or both counterclockwise about the axis of symmetry of seismic mass 22. Corresponding locations of the spiral springs are 180° out of the phase with each other angularly about the mass axis of symmetry. As the mass moves along the longitudinal axis of the housing, the springs are flexed so that the ends of shaft 21 connected to the respective springs move laterally of the housing axis along arcs corresponding to the spiral of the springs. Since the springs are identical and are disposed 180° out of phase with one another, the opposite ends of the shaft move equally but oppositely along substantially identical arcs. Since the midpoint of shaft 21 corresponds to the center of mass of seismic mass 22, it is seen that the center of mass of the movement does not shift from the longitudinal axis of the transducer. Accordingly, a transducer according to the present invention is insensitive to cross-axis loadings. The potentiometer registers displacements only along the longitudinal axis of the transducer even though the axis of symmetry of the mass may pivot relative to the longitudinal axis of the transducer about a point midway between springs 30 and 31, i.e., about the mass center of mass.

There has thus been disclosed a novel linear accelerometer with substantially zero cross-axis sensitivity, compact in size, resistant to shocks, and adaptable for use in varying temperature conditions.

What is claimed is:

1. A linear accelerometer comprising
   (a) a housing having a longitudinal axis,
   (b) a mass having an axis and disposed within the housing,
   (c) substantially identical first and second spiral springs secured to and supporting the ends of the mass at locations along the mass axis and spaced substantially equidistantly from the center of gravity of the mass and adapted to permit the mass to travel within the housing along the housing axis, the first and second springs being connected to the housing with their spirals 180° out of phase with each other to permit the ends of the mass to move equally along substantially identical arcs oriented transverse to the housing axis and curved in the same direction about the housing axis but 180° out of phase with each other about the housing axis when the mass is subjected to acceleration forces having components along the housing axis so that the mass center of gravity travels only along the housing axis, and
   (d) means for measuring the amount and direction of said movement of the mass.

2. A linear accelerometer comprising
   (a) a housing having longitudinal axis,
   (b) a mass symmetrical about an axis therethrough and disposed within the housing,
   (c) first and second substantially identical single spiral springs attached to opposite ends of the mass at locations along the mass axis of symmetry spaced substantially equidistantly from the center of gravity of the mass for supporting the mass for movement within the housing,
   (d) the first and second springs being arranged so that the springs spiral in the same direction about the housing axis and so that corresponding portions of the springs are angularly displaced by substantially 180° to cause the ends of the mass to move laterally of the housing axis equally and oppositely along substantially identical arcs transverse to the housing axis when the mass is subjected to acceleration forces whereby the center of mass moves only along the housing axis, and
   (e) measuring means for measuring the amount and direction of said movement of the mass.

3. A linear accelerometer, comprising:
   (a) a housing made from a first material having a predetermined temperature coefficient of expansion,
   (b) a symmetrical mass disposed within the housing, comprised of a center shaft and an inertial weight member,
   (c) the center shaft being made from said first material and passing along the longitudinal axis of the inertial weight member through the inertial weight member,
   (d) the weight member being made from a second material having a predetermined temperature coefficient of expansion,
   (e) first and second substantially identical single spiral springs attached to opposite ends of the mass along the mass axis of symmetry for supporting the mass within the housing,
   (f) the first and second springs being arranged so that the springs spiral in the same direction about the axis and so that corresponding portions of the springs are angularly displaced by substantially 180° to cause the ends of the mass to move substantially equally and oppositely along substantially identical arcs when the mass is subjected to acceleration forces, whereby the center of the mass moves only in one direction,
   (g) measuring means for measuring the amount and direction of movement of the mass, and
   (h) the first and second springs and the measuring means being secured to the center shaft of the mass.

4. A linear accelerometer, comprising:
   (a) a housing,
   (b) a mass disposed within the housing,
   (c) first and second substantially identical single spiral springs attached to opposite ends of the mass substantially equidistantly from the center of the mass and adapted to support the ends of the mass within the housing,
   (d) the inner end of the spiral of the second spring being disposed at diametrically opposed locations relative to the longitudinal axis of the mass along a reference line passing through the longitudinal axis of the mass from the inner end of the spiral of the first spring,
   (e) the inner ends of the spirals of both the first and second springs being substantially equidistant from the reference line,
   (f) the springs spiraling in the same direction about the same direction about the longitudinal axis of the mass, and
   (g) means for measuring the amount and direction of longitudinal movement of the mass.

5. In a linear accelerometer, the combination comprising:
   (a) a housing,
   (b) a mass disposed within the housing for movement along a longitudinal axis which normally coincides with an axis through the mass,
   (c) first and second spring plates, each of the spring plates having a spiral slot cut therethrough, said slot having a beginning point near but within the outer edge of said plate, and a terminal point near but not at the center of said plate,
   (d) means attaching the outer edge of the first spring plate to the housing in a plane perpendicular to the direction of longitudinal movement of said mass,
   (e) means attaching the center of said first spring plate to one end of the mass at a point along the axis through the mass,
   (f) means attaching the outer edge of the second spring plate to the housing in a plane parallel to the first spring plate,
   (g) means attaching the center of the second spring plate to the opposite end of the mass from the first spring plate, the springs being connected to the mass along the mass axis equidistantly from the center of gravity of the mass and being arranged in the housing so that the terminal point of the spiral slot of the second spring is at a point rotated 180° about the axis through the mass from the terminal point of the spiral slot in said first spring plate, and so that the slot of the second spring plate spirals about the axis through the mass in the same direction as the slot of the first spring plate, and
   (h) means for measuring the amount and direction of longitudinal movement of the said mass.

6. A linear accelerometer according to claim 5 in which:
   (a) the housing is made from a first material having a predetermined temperature coefficient of expansion and
   (b) the mass is comprised of
   (c) a center shaft and
   (d) an inertial weight member,
   (e) the center shaft being made from said first material and passing through the longitudinal axis of the inertial weight member,
   (f) the weight member being made from a second material having a predetermined temperature coefficient of expansion,
   (g) the first and second springs and the measuring means being secured to the center shaft of the mass.

7. An accelerometer comprising:
(a) a housing,
(b) an inertial mass having an axis and a center of mass located on the axis,
(c) means for mounting the mass to the housing for movement of the center of mass reciprocally longitudinally of the housing including
  (1) first and second planar single spiral springs connected between the housing and opposite ends of the mass at spaced apart locations along the mass axis so that the center of the mass is essentially equidistant from the springs,
  (2) the springs being disposed relative to the mass so that the springs spiral in the same direction about the mass axis and corresponding points of the springs are displaced 180° out of phase with each other about the mass axis, and
(d) means coupled to the mass for measuring the amount and direction of the mass longitudinally of the housing.

References Cited by the Examiner
UNITED STATES PATENTS

| | | | |
|---|---|---|---|
| 2,332,994 | 10/1943 | Draper | 73—497 |
| 2,348,225 | 5/1944 | Petty | 267—1 X |
| 2,357,356 | 9/1944 | Petty | 340—17 X |
| 2,618,776 | 11/1952 | Wiancko | 73—516 |
| 2,714,672 | 8/1955 | Wright | 73—517 |
| 2,715,680 | 8/1955 | Tatel | 73—516 |
| 2,752,466 | 6/1956 | Bonnell | 73—514 |
| 2,767,973 | 10/1956 | ter Veen | 73—517 |
| 2,788,511 | 4/1957 | Marshall | 267—1 |
| 2,870,422 | 1/1959 | Gindes | 73—517 |
| 2,886,676 | 5/1959 | Bourns | 73—516 |
| 2,989,298 | 6/1961 | Ljungstrom | 267—1 |
| 2,993,100 | 7/1961 | Maeder | 73—503 |
| 3,011,351 | 12/1961 | Bergsma | 73—519 |
| 3,020,767 | 2/1962 | Kistler | 73—497 |

RICHARD C. QUEISSER, *Primary Examiner.*

S. LEVINE, *Examiner.*